United States Patent
Hong et al.

(10) Patent No.: US 11,122,020 B2
(45) Date of Patent: Sep. 14, 2021

(54) STREAMING IMAGE ENCRYPTION METHOD AND COMPUTER PROGRAM, STREAMING IMAGE DECRYPTION METHOD AND COMPUTER PROGRAM

(71) Applicant: Hanwha Techwin Co., Ltd., Seongnam-si (KR)

(72) Inventors: Young Hun Hong, Seongnam-si (KR); Gun Soo Kim, Seongnam-si (KR); Gyu Tae Lee, Seongnam-si (KR); Jeong Sik Yun, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 329 days.

(21) Appl. No.: 16/256,046

(22) Filed: Jan. 24, 2019

(65) Prior Publication Data

US 2019/0253400 A1    Aug. 15, 2019

(30) Foreign Application Priority Data

Feb. 12, 2018    (KR) .................. 10-2018-0017060

(51) Int. Cl.
*H04L 29/06*    (2006.01)
*H04N 5/38*    (2006.01)

(52) U.S. Cl.
CPC ........... *H04L 63/0457* (2013.01); *H04N 5/38* (2013.01)

(58) Field of Classification Search
CPC ......... H04N 21/2347; H04N 21/23476; H04N 7/1675; H04N 21/4405; H04N 21/44055; H04N 21/6437
See application file for complete search history.

(56) References Cited

U.S. PATENT DOCUMENTS

| 8,782,727 B1* | 7/2014 | Nagarajan ........... H04L 43/0888 725/118 |
| 2007/0011344 A1* | 1/2007 | Paka ..................... G06F 21/10 709/231 |
| 2008/0300917 A1 | 12/2008 | Ryan et al. |
| 2009/0010429 A1 | 1/2009 | Kim et al. |
| 2011/0188652 A1* | 8/2011 | Yamaguchi ...... H04N 21/44055 380/210 |

FOREIGN PATENT DOCUMENTS

| JP | 2009-514303 A | 4/2009 |
| JP | 2012-165475 A | 8/2012 |
| KR | 10-0608077 B1 | 8/2006 |

(Continued)

OTHER PUBLICATIONS

Communication dated Mar. 2, 2018, issued by the Korean Intellectual Property Office in counterpart Korean Patent Application No. 10-2018-0017060.

(Continued)

*Primary Examiner* — Olugbenga O Idowu
(74) *Attorney, Agent, or Firm* — Sughrue Mion, PLLC

(57) ABSTRACT

A method of decrypting a streaming image includes: receiving a packet including at least an item which is encrypted, the item including at least one parameter used for decoding image data included in the streaming image; decrypting the item; and decoding the image data included in the streaming image based on the decrypted item, wherein the image data is not encrypted.

12 Claims, 6 Drawing Sheets

(56) References Cited

FOREIGN PATENT DOCUMENTS

| | | |
|---|---|---|
| KR | 10-20090002939 A | 1/2009 |
| KR | 10-1203266 B1 | 11/2012 |
| KR | 10-1238477 B1 | 3/2013 |
| KR | 10-1582128 B1 | 1/2016 |
| KR | 10-1646072 B1 | 8/2016 |
| WO | 2007/008362 A2 | 1/2007 |
| WO | 2007/008912 A2 | 1/2007 |
| WO | 2014/012516 A1 | 1/2014 |

OTHER PUBLICATIONS

Communication dated Apr. 6, 2018, issued by the Korean Intellectual Property Office in counterpart Korean Patent Application No. 10-2018-0017060.

\* cited by examiner

STREAMING IMAGE ENCRYPTION METHOD AND COMPUTER PROGRAM, STREAMING IMAGE DECRYPTION METHOD AND COMPUTER PROGRAM

CROSS-REFERENCE TO THE RELATED APPLICATION

This application claims priority from Korean Patent Application No. 10-2018-0017060, filed on Feb. 12, 2018, in the Korean Intellectual Property Office, the disclosure of which is incorporated herein in its entirety by reference.

BACKGROUND

1. Field

Methods and apparatuses consistent with exemplary embodiments of the inventive concept relate to encrypting and decrypting a streaming image, and more particularly, to encrypting and decrypting information used to decode a streaming image.

2. Description of the Related Art

With the recent development of information and communication technology, configurations and forms of surveillance cameras have been diversified gradually, and thus it is more important to enhance the security of images transmitted by the surveillance cameras.

According to the related art, a streaming image such as a real-time streaming image obtained by a surveillance camera is encrypted according to a secure real-time transfer protocol (sRTP). However, since this method encrypts a payload portion which occupies the largest portion of the streaming image, a high calculation amount is required and hardware design costs are increased.

SUMMARY

Resources used for encrypting a streaming image may be reduced by encrypting only information used for decoding the streaming image, without encrypting image data itself included in the streaming image.

The information used for decoding the streaming image may be included in a control response packet transmitted as a response to a command control for reproduction of the streaming image, and the information received at a receiver is encrypted, thereby reducing resources required for encrypting the streaming image.

By encrypting only those items that are essential for decoding the streaming image, security is enhanced and the resources for encrypting the streaming image are reduced.

Various aspects of the inventive concept will be set forth in part in the description which follows and, in part, will be apparent from the description, or may be learned by practice of the presented embodiments.

According to one or more exemplary embodiments, there is provided a method of decrypting a streaming image which may include: receiving a packet including at least an item which is encrypted, the item including at least one parameter used for decoding image data included in the streaming image; decrypting the item; and decoding the image data included in the streaming image based on the decrypted item, wherein the image data is not encrypted.

The received packet may be an image packet comprising at least a portion of the image data included in the streaming image.

The method may further include: transmitting a connection request to an image transmitting device from which the packet is received; and in response to the connection request, receiving a control response packet which is not encrypted and comprises information about the streaming image, prior to the receiving the packet.

The control response packet may further include information about a manner of encrypting the item, and the manner of encrypting the item may be determined based on at least one a size of the item and identification information about an image receiving device receiving the packet from the image transmitting device.

The received packet may be a control response packet received from an image transmitting device as a response to a command of an image receiving device for controlling reproduction of the streaming image, and at least a portion of the image data may be included in an image packet received after the receiving the packet.

The control response packet may be received from the image transmitting device in response to a connection request transmitted from the image receiving device under a real-time streaming protocol (RTSP), and the image packet may be received from the image transmitting device under a real-time transfer protocol (RTP).

The received packet may be a control response packet received from an image transmitting device during which a plurality of image packets constituting the streaming image are received from the image transmitting device, and the decoding the image data included in the streaming image may be performed based on a time corresponding to the controlling reproduction of the streaming image in reference to information included in the control response packet.

The received packet may be a control response packet comprising information about the streaming image and a manner of encrypting the item, and the manner of encrypting the item may be determined based on at least one of a size of the item and identification information about an image receiving device receiving the packet.

The encrypted item may comply with a session description protocol (SDP) and comprises at least one of sequence parameter set (SPS) information, picture parameter set (PPS) information, and video parameter set (VPS) information about the streaming image.

The method may further include transmitting a result of the decryption to the image transmitting device.

According to one or more exemplary embodiments, there is provided a method of encrypting a streaming image, which may include: generating a packet by encrypting at least an item which is encrypted, the item including at least one parameter used for decoding image data included in the streaming image; and transmitting the packet comprising the encrypted item to an image receiving device, wherein the image data is not encrypted.

The transmitted packet may be an image packet comprising at least a portion of the image data included in the streaming image.

The method may further include: receiving a connection request from an image receiving device; and in response to the connection request, transmitting a control response packet which is not encrypted and comprises information about the streaming image, prior to the transmitting the packet.

The control response packet may further include information about a manner of encrypting the item, and the manner of encrypting the item may be determined based on at least one a size of the item and identification information about the image receiving device receiving the packet from an image transmitting device.

The transmitted packet may be a control response packet transmitted to an image receiving device as a response to a command of the image receiving device for controlling reproduction of the streaming image, and at least a portion of the image data may be included in an image packet transmitted after the transmitting the packet.

The transmitted packet may be a control response packet transmitted to the image receiving device during which a plurality of image packets constituting the streaming image are transmitted to the image receiving device, and the decoding the image data included in the streaming image may be performed based on a time corresponding to the controlling reproduction of the streaming image in reference to information included in the control response packet.

The transmitted packet may be a control response packet comprising information about the streaming image and a manner of encrypting the item, and the manner of encrypting the item may be determined based on at least one of a size of the item and identification information about an image receiving device receiving the packet.

According an exemplary embodiment, there is provided a non-transitory computer-readable recording medium storing an instruction to control a processor to perform at least one of the above methods.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
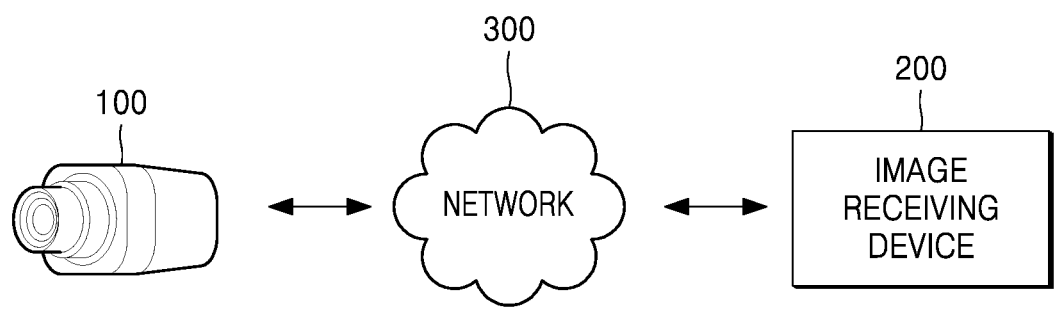
FIGS. 1 and 2 schematically show the configuration of an image encrypting/decrypting system according to an embodiment.

Reference will now be made in detail to exemplary embodiments in reference to the accompanying drawings, wherein like reference numerals refer to like elements throughout. In this regard, the presented embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The effects and features of the presented embodiments and methods of achieving them will be apparent with reference to the drawings. The inventive concept may, however, be embodied in many different forms and should not be construed as limited to the embodiments set forth herein.

In the following embodiments, the terms "first", "second", and the like are used for the purpose of distinguishing one element from another element. As used herein, the singular forms "a", "an", and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Sizes of elements in the drawings may be exaggerated for convenience of explanation. In other words, since sizes and thicknesses of components in the drawings are arbitrarily illustrated for convenience of explanation, the following embodiments are not limited thereto.

An example or exemplary embodiment provided in the following description is not excluded from being associated with one or more features of another example or another exemplary embodiment also provided therein or not provided therein but consistent with the inventive concept. For example, even if matters described in a specific example are not described in a different example thereto, the matters may be understood as being related to the other example, unless otherwise mentioned in descriptions thereof.

Figure 2:
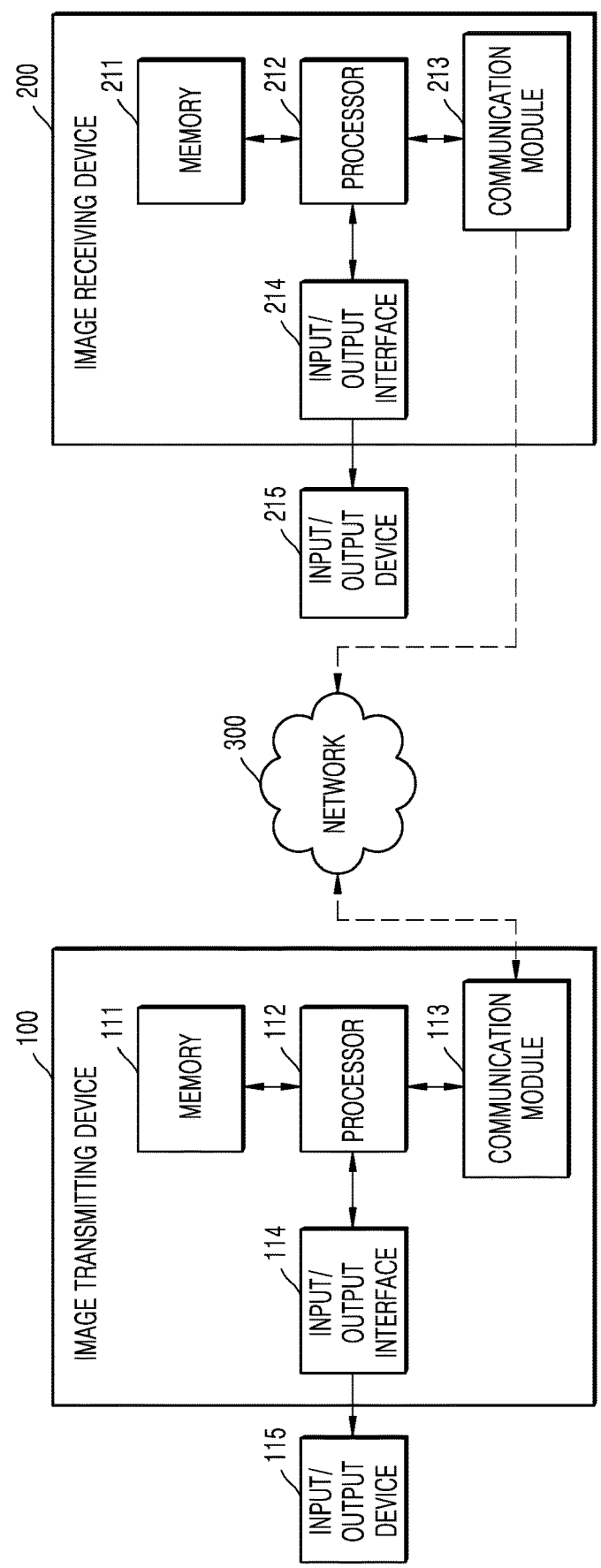

FIGS. 1 and 2 schematically show a configuration of an image encrypting/decrypting system according to an exemplary embodiment.

In an image encrypting/decrypting system according to an exemplary embodiment, regarding real-time image streaming, a streaming image may be encrypted or decrypted by encrypting or decrypting at least an item of a packet used to control transmitting and/or reproducing a streaming image.

To do this, the image encrypting/decrypting system according to an exemplary embodiment may include an image transmitting device 100, an image receiving device 200, and a network 300.

The term "decryption of an image" used herein refers to decrypt encryption of an encrypted image. The decryption of an image may be distinguishable from decoding of an image.

The term "decoding of an image" refers to decompression of an encoded image. The decoding of an image, as described above, is distinguishable from the decryption of an image.

The term "control of reproducing an image" or similar expressions used herein refers to a command or commanding for reproduction of an image, or changing a reproducing state or a reproducing point of the image. Such command or command for control may be for a reproduction start or play, pause, skip, fast forward, or the like of an image.

The image transmitting device 100 according to an exemplary embodiment is a device that transmits an image to the image receiving device 200. The image transmitting device 100 may be, as illustrated in FIG. 1, an image capturing device that transmits a captured image in real time, or any device that transmits an image to other devices in real time.

The image receiving device 200 according to an exemplary embodiment a device that receives an image transmitted by the image transmitting device 100 and may be any one of a video management system (VMS), a central management system (CMS), a network video recorder (NVR), and a digital video recorder (DVR).

The image transmitting device 100 and the image receiving device 200 may include, as illustrated in FIG. 2, memories 111 and 211, processors 112 and 212, communication modules 113 and 213, and input/output interfaces 114 and 214.

The memories 111 and 211 may each be a computer-readable recording medium, and may include a permanent mass storage device, such as random access memory (RAM), read only memory (ROM), a disk drive, or the like. Also, the memories 111 and 211 may each store an operating system and at least one program code.

These software components may be loaded from a computer-readable recording medium, different from the memories 111 and 211, by using a drive mechanism. This computer-readable recording medium may be a floppy drive, a disk, a tape, a DVD/CD-ROM drive, a memory card, or the like.

In other exemplary embodiments, the software components may be loaded into the memories 111 and 211 via the communication modules 113 and 213 rather than a computer-readable recording medium. For example, the software components may be loaded into the memories 111 and 211 based on a program that is installed by files provided through the network 300 by at least one program developer or a file distribution system that distributes application installation files.

The processors 112 and 212 may be configured to process instructions of a computer program, by performing basic arithmetic, logic, and input/output operations. Instructions may be provided to the processors 112 and 212 by the memories 111 and 211 or the communication modules 113 and 213. For example, the processors 112 and 212 may be configured to execute instructions received according to a program code stored in a recording device, for example, the memories 111 and 211.

The communication modules 113 and 213 may provide a function that allows the image transmitting device 100 and the image receiving device 200 to transmit or receive an image packet and/or a control response packet therebetween via the network 300. In one exemplary embodiment, the image transmitting device 100 may transmit an obtained image to the image receiving device 200 via the communication module 113 according to control of the processor 112.

Input/output interfaces 114 and 214 may each be a component for interface with input/output devices 115 and 215.

In this regard, the image transmitting device 100 may include an image obtaining component for obtaining an image as an input device, and the image receiving device 200 may include an image displaying component for displaying the received image as an output device.

In one or more exemplary embodiments, the image transmitting device 100 and the image receiving device 200 may each include more components than as illustrated in FIG. 2.

The network 300 may include at least one network selected from a personal area network (PAN), a local area network (LAN), a campus area network (CAN), a metropolitan area network (MAN), a wide area network (WAN), a broad band network (BBN), the Internet. The network 300 may include at least one network topology selected from a bus network, a star network, a ring network, a mesh network, a star-bus network, and a tree or hierarchical network. However, the network 300 is not limited thereto.

Hereinafter, operations of the image transmitting device 100 and the image receiving device 200 will be described with reference to FIGS. 3 to 6.

<Method of Encrypting Image by Image Transmitting Device 100>

The image transmitting device 100 according to an exemplary embodiment may encrypt at least an item included in an image packet and/or a control response packet to encrypt a streaming image. In this regard, the image packet may be a packet for transmitting a streaming image, and the control response packet may be a packet including a response to a command for controlling reproduction of the streaming image.

Hereinafter, the method of encrypting at least an item of the image packet and/or the control response packet and transmitting the encrypted image packet and/or control response packet will be described, and then, a method of decrypting a streaming image by the image receiving device 200 by receiving the encrypted image packet and/or control response packet will be described.

The processor 112 of the image transmitting device 100 according to an exemplary embodiment may identify identification information about the image receiving device 200 and, based on the identification result, maintain or terminate a communication session with the image receiving device 200. For example, the processor 112 of the image transmitting device 100 may identify a Media Access Control (MAC) address or other identification information about the image receiving device 200 included in a packet for connection and/or maintenance of a Transmission Control Protocol (TCP) session and/or a User Datagram Protocol (UDP) session. In addition, the processor 112 may terminate the TCP session and/or the UDP session when the identification information about the image receiving device 200 does not satisfy a certain authentication condition. As described above, according to an exemplary embodiment, inappropriate data transmission/reception may be prevented based on the identification information about the image receiving device 200.

The processor 112 according to an exemplary embodiment may transmit information about an encryption manner to the image receiving device 200.

The information about the "encryption manner" used herein may include information about an algorithm for encrypting an object to be encrypted (e.g., identification information about an algorithm other than the algorithm itself) and information about a size and/or a location of the object.

The information about the encryption manner may be information included in the control response packet transmitted before transmitting an image from the image transmitting device 100 to the image receiving device 200, or may be information transmitted in a separate packet. For example, in response to a real-time streaming protocol (RTSP) connection request of the image receiving device 200, information about the encryption manner may be transmitted in the control response packet, which transmits information about an image. In this case, the control response packet may be transmitted to the image receiving device 200 while being encrypted in a certain manner or not being encrypted. However, the present embodiment is an example only, and the inventive concept is not limited thereto.

The processor 112 of the image transmitting device 100 according to an exemplary embodiment may generate a packet having at least an item encrypted in a certain encryption manner.

The processor 112 according to an exemplary embodiment may generate an encrypted image packet by encrypting at least an item of an image packet containing at least a portion of a payload of a streaming image. Here, the payload may be image data of the streaming image The expression "at least a portion" of a streaming image refers to at least one frame among a plurality of frames constituting the streaming image, or at least a portion of at least one frame. In other words, an image packet generated by the processor 112 may include at least one frame or at least a portion of at least one frame. Accordingly, the streaming image may be transmitted in a frame unit or a slice (at least a portion of one frame) unit.

The term "an item" used herein refers to an item according to or complying a session description protocol (SDP) describing a streaming image. The item according to the SDP may include at least one of sequence parameter set (SPS) information, picture parameter set (PPS) information, and video parameter set (VPS) information. However, the present embodiment is an example only, and the inventive concept is not limited thereto.

According to the exemplary embodiment, information used to decode an image, not image data itself, is encrypted to reduce a resource used for encryption.

In one exemplary embodiment, the processor 112 encrypts at least an item of the control response packet to generate an encrypted control response packet, thereby encrypting a streaming image.

In this case, the control response packet may be a packet transmitted by the processor 112 in response to an RTSP connection request of the image receiving device 200 to transmit information about an image to the image receiving device 200, as described above. The control response packet may be a packet transmitted by the processor 112 to the image receiving device 200 in response to a control command of the image receiving device 200 for image reproduction, during transmission of a plurality of image packets.

Meanwhile, the control response packets described above may further include some items required for decoding the streaming image, in addition to the response to the request and/or command of the image receiving device 200. In this regard, the term "some items" used herein refers to an item according to an SDP describing a streaming image.

In one or more exemplary embodiments, the image packets may not include such "some items". In other words, "some items" may be transmitted to the image receiving device 200 only in the control response packet, and accordingly, when the control response packet is not received or the received control response packet is not decrypted, the image packet may not be decoded.

Thus, according to an exemplary embodiment, information used to decode an image is encrypted and transmitted not in the image packet but in the control response packet which is transmitted as a response to a control command for reproducing an image. By doing so, resources required for encrypting may be reduced.

According to exemplary embodiment, only items required for decoding a streaming image are encrypted, and thus, an image encryption manner with enhanced security may be obtained and resources required for encrypting may be reduced.

According to an exemplary embodiment, the processor 112 may generate an encrypted image packet and/or an encrypted control response packet in various manners.

For example, when a first byte number, which is the number of bytes of an item described above, is equal to or less than a reference byte number, the processor 112 may encrypt at least an item in a first manner to generate an encrypted packet.

When the first byte number is equal to or greater than the reference byte number and does not have a remainder when divided by the reference byte number, the processor 112 may completely encrypt the item in a second manner.

When the first byte number is greater than the reference byte number and the first byte number has a remainder when divided by the reference byte number, the processor 112 may encrypt at least a portion of the item in the second manner and encrypt the other portion thereof in a third manner, thereby generating an encrypted packet. In this case, the portion encrypted in the second manner is the portion that does not have the remainder when divided by the reference byte number remainder, and the other portion thereof may be a portion that has the remainder when divided by the reference byte number.

Meanwhile, the first manner may mean, for example, a method of encrypting an object to be encrypted in a notation method. The second manner may mean a method of encrypting an object to be encrypted by using a predetermined key. The third manner may mean a method that does not encrypt an object to be encrypted.

The term "reference byte number" used herein may be determined based on at least one of identification information about the image receiving device 200 and user identification information about the image receiving device 200.

The processor 112 according to an exemplary embodiment may transmit a packet that is encrypted according to the process as described above to the image receiving device 200. For example, when the encrypted packet is an image packet, the processor 112 may transmit the encrypted image packet to the image receiving device 200. In this regard, the processor 112 may transmit the image packet to the image receiving device 200 in a real-time transport protocol (RTP) manner.

For example, when the encrypted packet is a control response packet, the processor 112 may transmit the encrypted control response packet to the image receiving device 200. In this regard, the processor 112 may transmit the control response packet to the image receiving device 200 in an RTSP manner.

The image receiving device 200 decrypts the encrypted image packet and/or control response packet according to a predetermined decryption manner to identify an encrypted item, and, based on the obtained result, decodes a streaming image. A detailed description thereof will be given later.

Meanwhile, the processor 112 according to an exemplary embodiment may receive information about the decryption result of the streaming image from the image receiving device 200. Referring to the information about the received decryption result, the processor 112 may appropriately adjust the number of slices or the like to generate and transmit image packets of a streaming image to the image receiving device 200.

<Method of Decrypting Image by the Image Receiving Device 200>

Hereinafter, assuming that the image transmitting device 100 generates and transmits an image packet and/or control response packet in which at least an item is encrypted according to the above-described process, the decrypting method will be described in connection with FIGS. 3 and 4. Hereinafter, an image receiving device 200A and an image receiving device 200B are used only for convenience of description, and may be substantially the same as the image receiving device 200 shown in FIG. 2.

Figure 3:
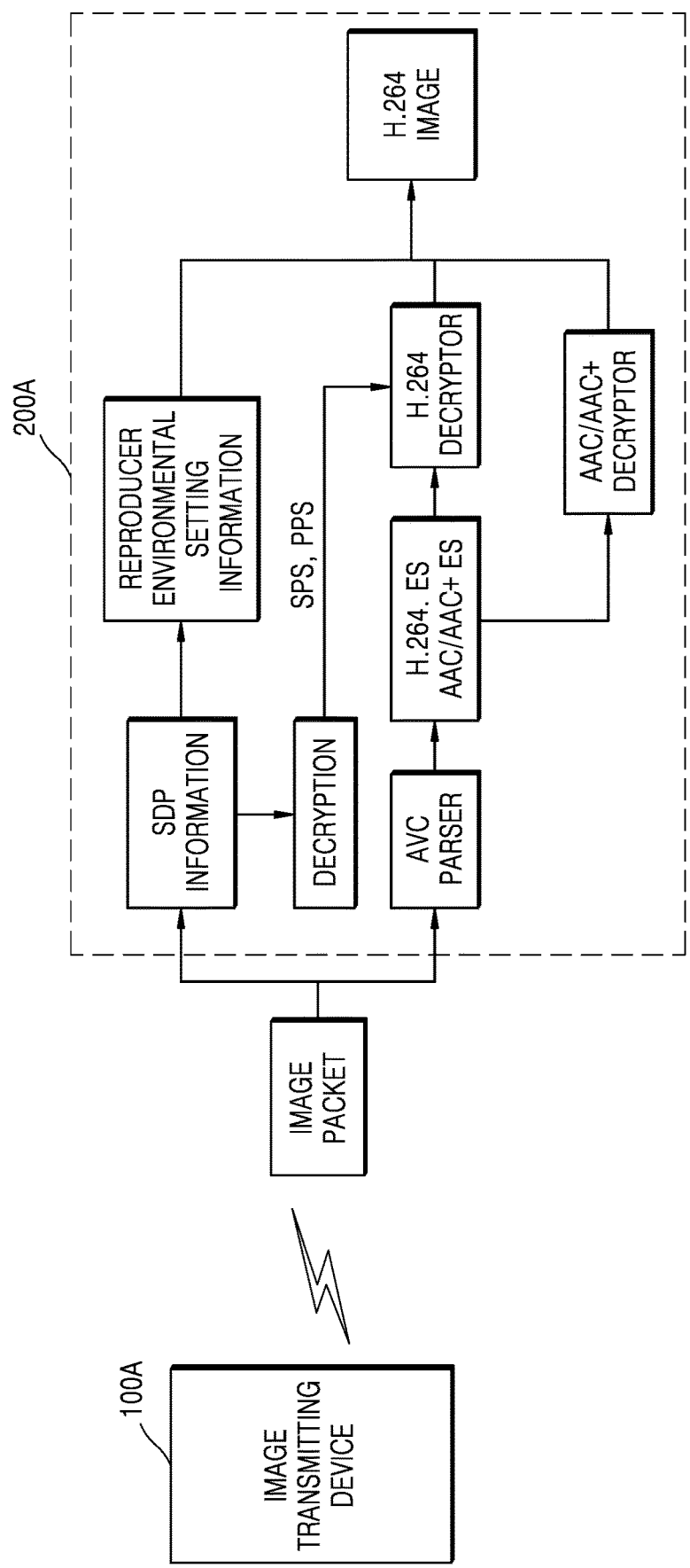
FIG. 3 shows a diagram to explain an operation of an image receiving device in an H.26X-based streaming system according to an embodiment.

FIG. 3 shows a diagram to explain an operation of the image receiving device 200A in an H.26X-based streaming system according to an exemplary embodiment. Referring to FIG. 3, the processor 212 of the image receiving device 200A according to an exemplary embodiment may receive an image packet, in which at least an item is encrypted, from the image transmitting device 100A. In this regard, the image packet may be received in an RTP manner.

The received image packet may be an image packet in which at least an item is encrypted. The received image packet may refer to a packet in which an item according to an SDP describing a streaming image is encrypted. The item according to the SDP may include, as described above, at least one of SPS information, PPS information, and VPS information.

The processor 212 according to an exemplary embodiment may decrypt the item of the image packet encrypted according to an encryption manner which has been predetermined between the image transmitting device 100A and the image receiving device 200A. The processor 212 may decode a streaming image based on the decrypted item. For example, the processor 212 may decrypt SDP information in the image packet as shown in FIG. 3 and decode at least a portion of the streaming image by using the decrypted SDP information.

As described above, the image packet may include "at least a portion" of the streaming image. The "at least a portion" may refer to at least one frame among a plurality of frames constituting a streaming image or at least a portion of at least one frame of the streaming image.

Accordingly, the processor 212 according to an exemplary embodiment may decode, from an image packet, at least one frame or at least a portion of at least one frame. That is, the processor 212 may decode an image in a frame unit or a slide unit (at least a portion of one frame).

According to an exemplary embodiment, information used to decode an image, not image data itself, is encrypted/decrypted to minimize a resource used for encryption/decryption.

Figure 4:
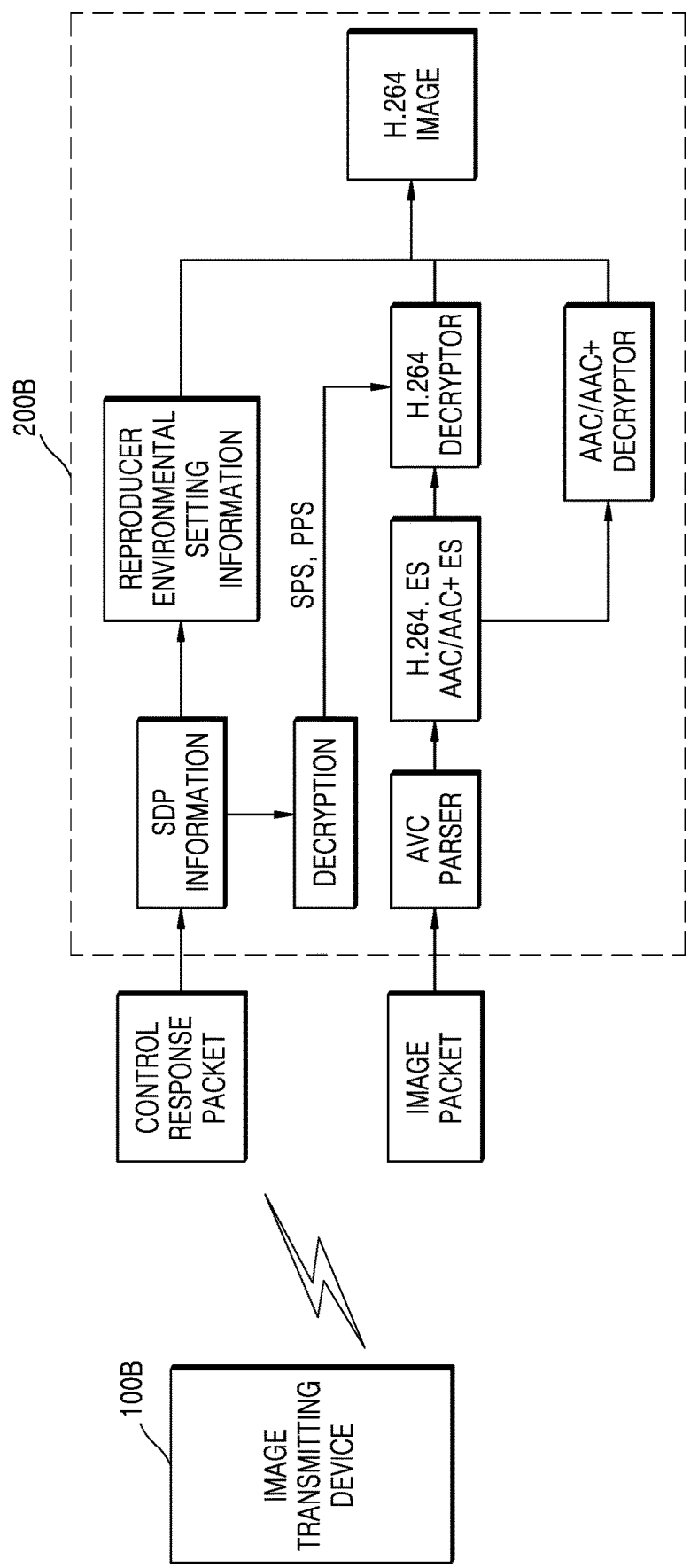
FIG. 4 shows a diagram to explain an operation of an image receiving device in an H.26X-based streaming system according to an embodiment.

FIG. 4 shows a diagram to explain an operation of the image receiving device 200B in an H.26X-based streaming system according to an exemplary embodiment. Referring to FIG. 4, the processor 212 of the image receiving device 200B according to an exemplary embodiment may receive a control response packet, in which at least some items are encrypted, from the image transmitting device 100B. In this regard, the control response packet may be received in an RTSP manner.

The image receiving device 200B may also receive an image packet containing at least a portion of a payload (image data) of the streaming image from the image transmitting device 100B. In this regard, the image packet may be received in an RTP manner.

In one exemplary embodiment, "some items" to be encrypted may be included only in the control response packet. In other words, the image packet may not include the some items described above. In this regard, the term "some items" used herein refers to an item according to an SDP describing a streaming image. The item according to the SDP may include at least one of SPS information, PPS information, and VPS information.

In one or more exemplary embodiments, "some items" may be transmitted to the processor 212 only in a control response packet, and accordingly, when the control response packet is not received or the received control response packet is not decrypted, the image packet may not be decoded.

In one exemplary embodiment, the processor 212 may decrypt some items of the control response packet encrypted according to an encryption manner which has been predetermined between the image transmitting device 100B and the image receiving device 200B. The processor 212 may decode a streaming image based on the decrypted items. For example, the processor 212 may decrypt SDP information in the control response packet as shown in FIG. 4 and decode at least a portion of a payload (image data) of the streaming image from the image packet by using the decrypted SDP information.

The control response packet may be, as described above, a packet that is transmitted by the image transmitting device 100B to the processor 212 to deliver information about an image in response to an RTSP connection request of the processor 212. In this case, the control response packet may further include information about an encryption manner between the image transmitting device 100B and the processor 212. In this regard, the control response packet may be transmitted from the image transmitting device 100B to the processor 212 while being encrypted in a certain manner or not being encrypted.

Meanwhile, the control response packet may be a packet that is transmitted by the image transmitting device 100B in response to a control command of the processor 212 for reproducing a streaming image, during which a plurality of image packets constituting a streaming image are received. In one or more exemplary embodiments, the image receiving device 200B, with reference to information included in the control response packet, may decode at least a portion of a payload (image data) of the streaming image corresponding to the time corresponding to the control command for reproducing the streaming image, from the image packet. In this regard, the control response packet may include information about the time corresponding to the reproduction control command and "some items" required for decrypting the image packet in the encrypted form.

Thus, according to the present embodiment, not the image packet but the control response packet used to control a streaming image is encrypted/decrypted to minimize resources consumed for encryption/decryption.

According to the present embodiment, only items required for decoding a streaming image are partially encrypted, and thus, an image encryption manner with enhanced security may be obtained and resources required for decryption may be reduced.

The image receiving device 200 according to an exemplary embodiment may transmit information about results obtained by decrypting an image packet and/or control response packet (for example, information about whether a streaming image is normally decrypted and/or decoded) to the image transmitting device 100. The image transmitting device 100, based on the information about decryption and/or decoding results, determined whether the transmission of the streaming image is normally performed, and may make appropriate measurements accordingly.

Figure 5:
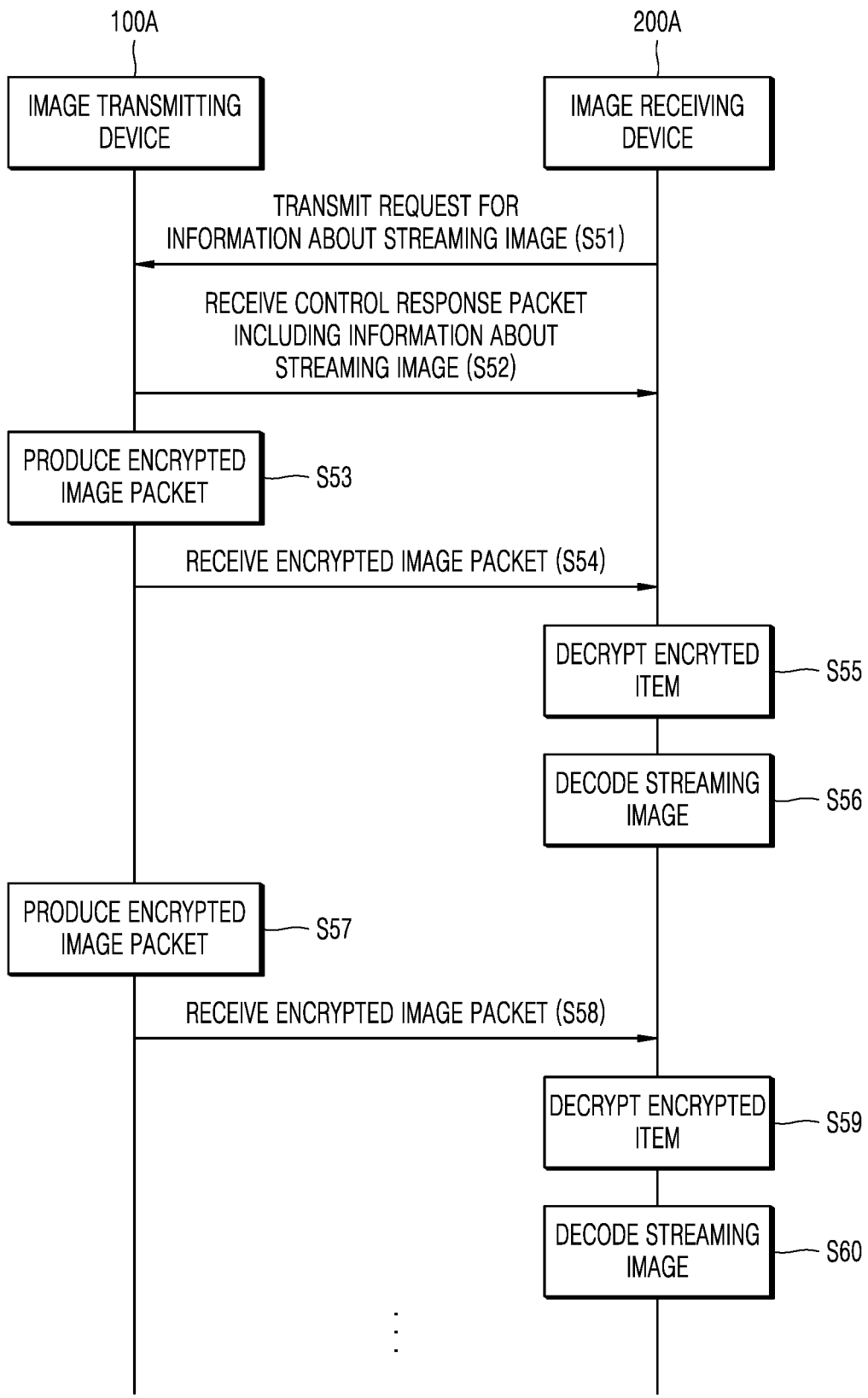
FIG. 5 is a flowchart illustrating a method of encrypting and decrypting a streaming image, performed by an image transmitting device and the image receiving device of FIG. 3.

FIG. 5 is a flowchart illustrating a method of encrypting and decrypting a streaming image, performed by the image transmitting device 100A and the image receiving device 200A of FIG. 3. Hereinafter, descriptions which have been made in connection with FIGS. 1 to 4 will be omitted.

The image receiving device 200A may transmit a request for information about a streaming image to the image transmitting device 100A (S51). The request transmitted by the image receiving device 200A may be, for example, an RTSP connection request.

The image receiving device 200A according to an exemplary embodiment may receive the information about the streaming image transmitted by the image transmitting device 100A, in response to the request according to operation S51 (S52). In this regard, the image transmitting device 100A according to an exemplary embodiment may transmit the information about the streaming image in a control response packet. In one exemplary embodiment, the image transmitting device 100A may further include in the control response packet information about an encryption manner of an image packet to be transmitted.

The image transmitting device 100A may generate an image packet that is encrypted according to the encryption manner informed to the image receiving device 200A in operation S52 (S53). In this regard, the image transmitting device 100A may encrypt at least some items of the image packet including at least a portion of a payload (image data) of the streaming image to generate an encrypted image packet.

The term "at least a portion" of a streaming image refers to at least one frame among a plurality of frames constituting the streaming image, or at least a portion of at least one frame. In other words, the image packet generated by the image transmitting device 100A may include at least one frame or at least a portion of at least one frame. Accordingly, the streaming image may be transmitted in a frame unit or a slice (at least a portion of one frame) unit.

The term "an item" or "items" used herein refers to an item or items according to an SDP describing a streaming image. The item according to the SDP may include at least one of SPS information, PPS information, and VPS information. However, the present embodiment is an example only, and the inventive concept is not limited thereto.

Thus, according to the exemplary embodiment, information used to decode a streaming image, not image data itself, is encrypted to minimize resources used for encryption.

The image transmitting device 100A may perform encrypting in various manners, in generating the encrypted image packet as described in operation S53.

For example, when a first byte number, which is the number of bytes of an item described above, is equal to or less than a predetermined reference byte number, the image transmitting device 100A may encrypt at least some items in a first manner to generate the encrypted packet.

When the first byte number is equal to or greater than the reference byte number and does not have a remainder when divided by the reference byte number, the image transmitting device 100A may encrypt all of the some items in a second manner.

When the first byte number is greater than the reference byte number and the first byte number has a remainder when divided by the reference byte number, the image transmitting device 100A may encrypt at least a portion of the some items in the second manner and encrypt the other portion in a third manner, thereby generating an encrypted packet. In this case, the portion encrypted in the second manner is the portion that does not have the remainder when divided by the reference byte number remainder, and the other portion may be a portion that has the remainder when divided by the reference byte number.

Meanwhile, the first manner may mean, for example, a method of encrypting an object to be encrypted in a predetermined notation method. The second manner may mean a method of encrypting an object to be encrypted by using a predetermined key. The third manner may mean a method that does not encrypt an object to be encrypted.

The term "reference byte number" used herein may be determined based on at least one of identification information about the image receiving device 200A and user identification information about the image receiving device 200A.

The image receiving device 200A according to an exemplary embodiment may receive an encrypted image packet that is generated in operation S53 from the image transmitting device 100A (S54). For example, the image receiving device 200A may receive the encrypted image packet in the RTP manner.

The image receiving device 200A according to an exemplary embodiment may identify an encrypted item by decrypting the encrypted image packet according to a predetermined decryption manner, and based on the obtained result, decode a streaming image (S56). Hereinafter, descriptions will be provided in connection with FIG. 3.

Referring to FIG. 3, the image receiving device 200A according to an exemplary embodiment may receive an image packet, in which at least some items are encrypted, from the image transmitting device 100A. In this regard, the image packet may be received in the RTP manner.

In this regard, the received image packet may refer to a packet in which an item according to an SDP describing a streaming image is encrypted, for example. The item according to the SDP may include, as described above, at least one of SPS information, PPS information, and VPS information.

The image receiving device 200A according to an exemplary embodiment may decrypt some items of the image packet encrypted according to a decryption manner which is predetermined between the image transmitting device 100A and the image receiving device 200A. The image receiving device 200A may decode a streaming image based on the decrypted items. For example, the image receiving device 200A may decrypt SDP information in the image packet as shown in FIG. 3, and decode at least a portion of a payload (image data) of the streaming image by using the decrypted SDP information.

As described above, the image packet may include "at least a portion" of the streaming image. The "at least a portion" may refer to at least one frame among a plurality of frames constituting the streaming image or at least a portion of at least one frame of the streaming image. Accordingly, the image receiving device 200A according to an exemplary embodiment may decode, from the image packet, at least one frame or at least a portion of at least one frame. That is, the image receiving device 200A may decode an image in a frame unit or a slide unit (at least a portion of one frame).

In one exemplary embodiment, the image transmitting device 100A and the image receiving device 200A may repeatedly perform operation S53 through operation S56 to transmit or receive a streaming image (S57 through S60).

Thus, according to the present exemplary embodiment, information used to decode an image, not image data itself, is encrypted/decrypted to reduce resources used for encryption/decryption.

Figure 6:
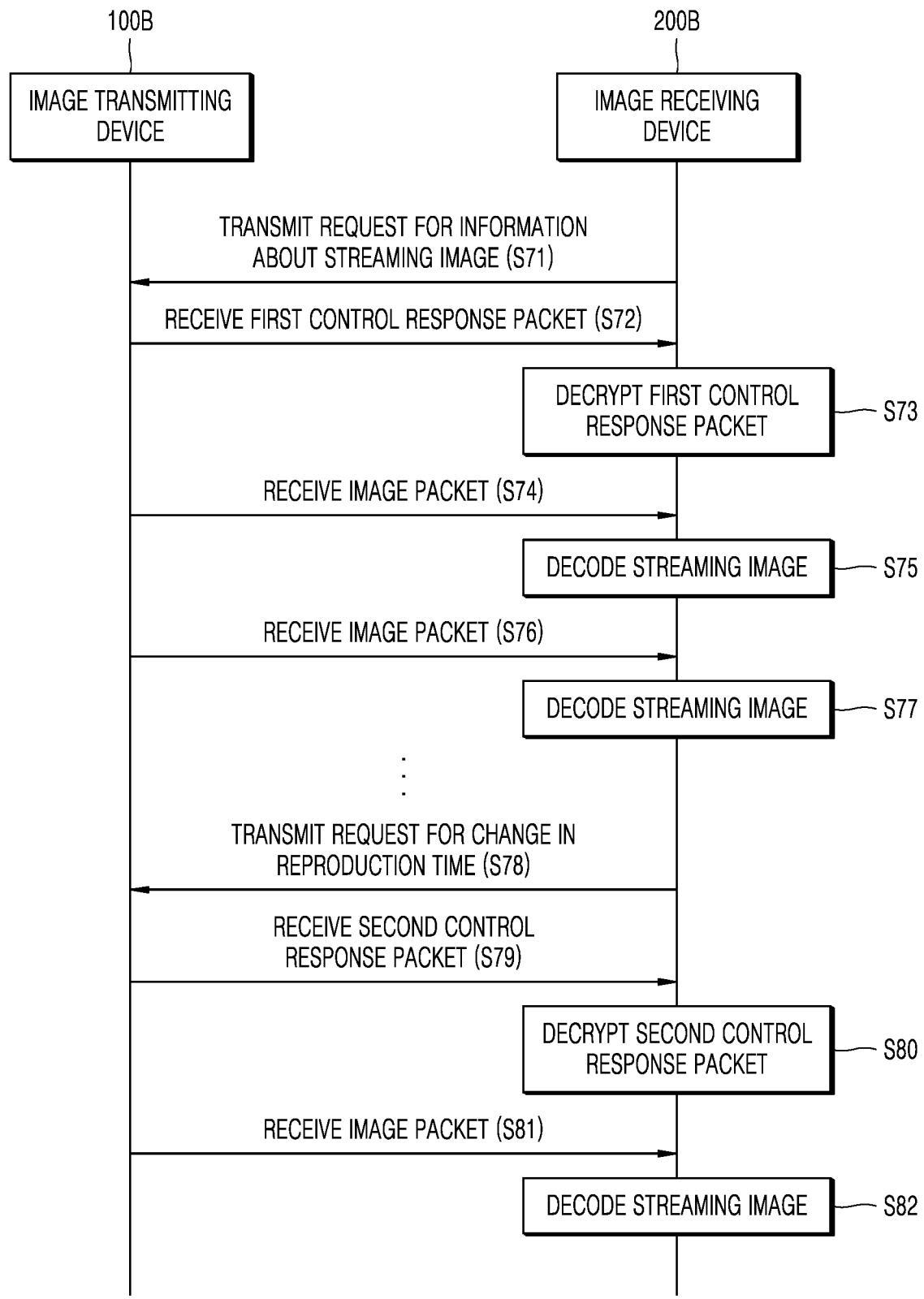
FIG. 6 is a flowchart illustrating a method of encrypting and decrypting a streaming image, performed by an image transmitting device and the image receiving device of FIG. 4.

FIG. 6 is a flowchart illustrating a method of encrypting and decrypting a streaming image, performed by the image transmitting device 100B and the image receiving device 200B of FIG. 4. Hereinafter, descriptions which have been made in connection with FIGS. 1 to 4 will be omitted.

The image receiving device 200B may transmit a request for information about a streaming image to the image transmitting device 100B (S71). The request transmitted by the image receiving device 200B may be, for example, an RTSP connection request.

The image receiving device 200B according to an exemplary embodiment may receive a first control response packet transmitted by the image transmitting device 100B, in response to the request according to operation S71 (S72). In this regard, the first control response packet may include information about a streaming image and information about an encryption manner of a packet to be encrypted. The first control response packet may be encrypted in an encryption manner which is predetermined between the image transmitting device 100B and the image receiving device 200B according to exemplary embodiments. In one or more exemplary embodiments, a control response packet that is originally transmitted by the image receiving device 200B and received by the image transmitting device 1008 may be received in a non-encrypted form.

The image receiving device 200B may decrypt the first control response packet received in operation S72. As described above, in one exemplary embodiment, "an item" to be encrypted may be included only in a control response packet. In other words, an image packet may not include the item. In this regard, the term "item" used herein refers to an item according to an SDP describing a streaming image. The item according to the SDP may include at least one of SPS information, PPS information, and VPS information.

As described above, in one or more exemplary embodiments, the item may be delivered to the image receiving device 200B only in the control response packet, and accordingly, when the image receiving device 200B does not receive the control response packet or the received control response packet is not decrypted, an image packet may not be decrypted.

Then, the image receiving device 200B according to an exemplary embodiment may receive the image packet (S74) and decode a streaming image from the received image packet (S75).

For example, the image receiving device 200B may decode the streaming image based on the decrypted item from the first control response packet in operation S73. In other words, the image receiving device 200B may decrypt, as illustrated in FIG. 4, SDP information in the control response packet, and based on the decryption result, decode at least a portion of a payload (image data) of the streaming image from an image packet.

In one exemplary embodiment, the image transmitting device 100B and the image receiving device 200B may repeatedly perform operation S74 and operation S75 to transmit or receive the streaming image (S76 and S77).

Meanwhile, the control response packet may be a packet that is transmitted by the image transmitting device 100B in response to a command of the image receiving device 200B for controlling reproduction of a streaming image, during which a plurality of image packets constituting the streaming image are received.

In other words, the image receiving device 200B according to an exemplary embodiment may transmit a reproduction time change request to the image transmitting device 100B (S78), and may receive, as a response to the reproduction time change request, a second control response packet from the image transmitting device 100B (S79) In this regard, the second control response packet, like the first control response packet, may include an item according to an SDP describing a streaming image.

In this regard, the image receiving device 200B according to an exemplary embodiment, like in operation S73, may decrypt the received second control response packet (S80), and based on the decryption result, repeatedly perform operation S75, thereby transmitting or receiving the streaming image (S81 and S82).

The above-described exemplary embodiments can be implemented in the form of a computer program that can be executed by various components on a computer, and such a computer program can be recorded on a computer-readable medium. In this regard, the computer-readable medium may be a magnetic medium such as a hard disk, a floppy disk and a magnetic tape, an optical recording medium such as CD-ROM and DVD, a magneto-optical medium such as a floptical disk, and a hardware device specifically configured to store and execute program instructions, such as ROM, RAM, flash memory, and the like. Further, the computer-readable medium may include an intangible medium that is implemented in a form that can be transmitted over a network, and may be, for example, a medium that is implemented in software or an application form and can be transmitted and distributed through a network.

Meanwhile, the computer program may be specifically designed and configured for the present embodiments or may be known and used by those skilled in the computer software field. Examples of computer programs may include machine language code such as those produced by a compiler, as well as high-level language code that may be executed by a computer using an interpreter or the like.

At least one of the components, elements, modules or units (collectively "components" in this paragraph) represented by a block in the drawings may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The specific executions described in the present embodiments are provided for illustrative purpose only, and do not limit the scope of the inventive concept. For brevity of description, descriptions of electronic configurations of the related art, control systems, software, and other functional aspects of the systems may be omitted. Also, the connections or connection members of the lines between the components shown in the figures illustrate functional connections and/or physical or circuit connections, which may be replaced or added by a variety of functional connections, physical connection, or circuit connections. Also, unless stated with the limiting expressions "essential", "importantly", and the like, a component may not be a necessary component for application.

Accordingly, the scope of the inventive concept should not be construed as being limited to the above-described embodiments, and may include claims, and all ranges that are equivalent to the claims or that are equivalently modified from the claims.

As described above, according to the above embodiments, information used to decode an image, not image data itself, is encrypted to reduce a resource used for encryption.

Thus, according to the above embodiments, information used to decode an image is encrypted and transmitted not in image packet but in a control response packet which is transmitted in response to a control command for image reproduction. By doing so, resources required for encrypting may be minimized.

In addition, according to the present embodiments, only items required for decoding a streaming image are encrypted, and thus, security is enhanced and resources required for encrypting are reduced.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method of decrypting a streaming image, the method comprising:
   receiving a packet comprising at least an item which is encrypted, the item comprising at least one parameter used for decoding image data included in the streaming image, wherein the packet is a control response packet received from an image transmitting device as a response to a command of an image receiving device for controlling reproduction of the streaming image;
   decrypting the item;
   receiving an image packet including at least a portion of the image data; and
   decoding the at least the portion of the image data based on the decrypted item,
   wherein the at least the portion of the image data is not encrypted.

2. The method of claim 1, wherein the control response packet is received from the image transmitting device in response to a connection request transmitted from the image receiving device under a real-time streaming protocol (RTSP), and
   wherein the image packet is received from the image transmitting device under a real-time transfer protocol (RTP).

3. The method of claim 1, wherein the control response packet is received from the image transmitting device during which a plurality of image packets constituting the streaming image are received from the image transmitting device, and
   wherein the decoding the image data included in the streaming image is performed based on a time corresponding to the controlling reproduction of the streaming image in reference to information included in the control response packet.

4. The method of claim 1, wherein the control response packet comprises information about the streaming image and a manner of encrypting the item, and
   wherein the manner of encrypting the item is determined based on at least one of a size of the item and identification information about the image receiving device receiving the packet.

5. The method of claim 1, wherein the item complies with a session description protocol (SDP) and comprises at least one of sequence parameter set (SPS) information, picture parameter set (PPS) information, and video parameter set (VPS) information about the streaming image.

6. The method of claim 1, further comprising transmitting a result of the decryption to the image transmitting device.

7. A method of encrypting a streaming image, the method comprising:
   generating a packet by encrypting at least an item which is encrypted, the item comprising at least one parameter used for decoding image data included in the streaming image, wherein the packet is a control response packet transmitted to an image receiving device as a response to a command of the image receiving device for controlling reproduction of the streaming image; and
   transmitting the packet comprising the encrypted item to the image receiving device; and
   transmitting an image packet including at least a portion of the image data, wherein the at least the portion of the image data is not encrypted.

8. The method of claim 7, wherein the control response packet is transmitted to the image receiving device during which a plurality of image packets constituting the streaming image are transmitted to the image receiving device, and
   wherein the decoding the image data included in the streaming image is performed based on a time corresponding to the controlling reproduction of the streaming image in reference to information included in the control response packet.

9. The method of claim 7, wherein the control response packet comprises information about the streaming image and a manner of encrypting the item, and
   wherein the manner of encrypting the item is determined based on at least one of a size of the item and identification information about the image receiving device receiving the packet.

10. The method of claim 7, wherein the item complies with a session description protocol (SDP) and comprises at least one of sequence parameter set (SPS) information, picture parameter set (PPS) information, and video parameter set (VPS) information about the streaming image.

11. A non-transitory computer-readable recording medium storing an instruction to control a processor to perform the method of claim 1.

12. A non-transitory computer-readable recording medium storing an instruction to control a processor to perform the method of claim 7.

* * * * *